United States Patent

[11] 3,617,568

[72] Inventor Herman E. Ries, Jr.
 Chicago, Ill.
[21] Appl. No. 460
[22] Filed Jan. 2, 1970
[45] Patented Nov. 2, 1971
[73] Assignee Standard Oil Company
 Chicago, Ill.

[54] PROCESS FOR FLOCCULATING COLLOIDAL PARTICLES BY THE SEQUENTIAL ADDITION OF POLYMERS
 1 Claim, No Drawings

[52] U.S. Cl. .................................................... 210/53
[51] Int. Cl. ............................................... B01d 21/01
[50] Field of Search ........................................ 210/52–54

[56] References Cited
UNITED STATES PATENTS

| | | | |
|---|---|---|---|
| 3,377,274 | 4/1968 | Burke et al. .................. | 210/53 |
| 3,542,674 | 11/1970 | Machlan ....................... | 210/42 |

OTHER REFERENCES

Cohen, J. M., et al., Natural and Synthetic Polyelectrolytes as Coagulant Aids, Jour. AWWA, Vol. 50, Apr. 1958, pp. 463–478 (copy in Gp. 176) 210–52

Black, A. P., Basic Mechanisms of Coagulation, Jour. AWWA, Vol. 52, Apr. 1960, pp. 492–504 (copy in Gp. 176)

Black, A. P., et al., Electrophoretic Studies of Coagulation for Removal of Organic Color, Jour. AWWA, Vol. 53, May 1961, pp. 589–604 (copy in Gp.176)

Riddick, T. M., Zeta Potential and Polymers, Vol. 58, Jour. AWWA, June 1966, pp. 719–722 (Copy in Gp. 176)

*Primary Examiner*—Michael Rogers
*Attorneys*—Arthur G. Gilkes, William T. McClain and John J. Connors ABSTRACT: The removal of colloidal particles from a colloidal system is enhanced by sequential addition of two polymeric flocculants in controlled amounts. The first has a polymeric ion form whose charge is opposite that of the colloidal particles and the second has a polymeric ion form whose charge is opposite that of the first polymeric ion. This process is particularly effective in aqueous systems and forms large, strongly bonded flocs of low density which may be readily removed by steps such as filtration of flotation.

з,617,568

PROCESS FOR FLOCCULATING COLLOIDAL PARTICLES BY THE SEQUENTIAL ADDITION OF POLYMERS

BACKGROUND OF THE INVENTION

This invention relates to a method of removing colloidal particles from a liquid medium and more particularly to a method of flocculating charged colloidal particles through the controlled sequential addition of oppositely charged polymeric flocculants.

Flocculation is a well-known means of removing colloidally dispersed particles from a colloidal system. Conventional methods employ inorganic agents as a means of forming the particles into flocs. The use of such inorganic agents accomplishes the intended result, but not without creating difficulties. Disadvantages of the inorganic flocculants include:

1. The addition of excessive amounts of the inorganic flocculant is necessary in order to reduce the particle concentration to a specified level.
2. The removed flocculant-particle combination is not suited to ready disposal.
3. Inorganic agents may be sensitive to and have a substantial effect upon the pH of the system.
4. The flocs produced may be weakly bonded and of small dimensions, thus making the process of removing the flocs from the system inefficient.

It is also known in the art to use polymeric agents to effect flocculation. Such flocculants overcome the first three disadvantages listed above, but still result in flocs of relatively small dimensions which are not well suited to efficient removal when compared to flocs of greater dimension. From U.S. Pat. No. 3,055,827 it is known to add two specified polymeric flocculants sequentially. That patent, however, teaches only two specific flocculants and teaches neither what properties of the flocculants are important nor how to control the addition rate as a function of zeta-potential. Organic flocculants are expensive and, therefore, the use of organic agents are prohibitive unless the efficiency is improved to the point where their use is economically feasible. Increasing the efficiency of the organic agents is thus of substantial importance.

SUMMARY OF INVENTION

A process has now been discovered which provides an improved method of flocculating charged colloidal particles so that the flocs will be readily removable from the colloidal system by known processes. It has further been discovered how to form readily removable flocs without employing excessive amounts of flocculating agents. Particularly, an improved method of facilitating removal of charged colloidal contaminants from waste water has been discovered.

The process of the present invention may be accomplished through the controlled sequential addition of polymeric flocculants to the colloidal system. The first flocculant added must be soluble in the liquid medium and must form a polymeric ion having a charge opposite in sign to that of the charged particles when it dissolves. It is added in an amount which is sufficient to reverse the sign of the zeta-potential of the colloidal system. Then, the second flocculant is added. It too must be soluble in the liquid medium and when it dissolves, must form a polymeric ion having a charge opposite in sign to that of the first polymeric ion. The second polymeric flocculant should be added in an amount sufficient to form large flocs. Preferably, the amount of addition should be sufficient to form flocs having a diameter equal to or greater than 0.1 mm. to facilitate removal.

The addition of the first flocculant results in the formation of many relatively small flocs. The addition of the second flocculant results in the formation of unusually large flocs of low density. These large flocs are strongly bonded and tend to float to the surface because of their lower density. Consequently, removal by known processes such as flotation or filtration is greatly facilitated.

DETAILED DESCRIPTION OF INVENTION

The steps in the process of the present invention include first adding to the colloidal system a polymeric flocculant which will form a polymeric ion having a charge opposite in sign to that of the colloidal particles. The amount added should be sufficient to just barely reverse the sign of the zeta-potential of the system, at which point numerous small flocs are present. Then, a small amount of a second polymeric flocculant is added. It contributes a polymeric ion whose charge is opposite to that of the first flocculant and is added in an amount sufficient to form large flocs. Preferably, the resultant flocs will have a diameter of at least 0.1 mm. Although the particular type of flocculants employed may influence the amount of addition required, in most cases the formation of flocs of the requisite size may be achieved through the addition of an amount of the second flocculant which is sufficient to again reverse the sign of the zeta-potential of the system.

The generally accepted theory explaining the electronics of colloidal systems is the double layer theory. According to this theory a bare charged particle is surrounded by ions having charges opposite to the particle and effecting overall electronic neutrality. The surrounding ions may be considered to be in two layers, one mobile and one immobile. Thus, the ions immobily associated with the charged particle counteract to a greater or lesser extent the charge of the bare particle. The observed charge of the colloidal particle is the net charge of the bare particle and the associated immobile layer. When a potential gradient is applied to a system containing such particles they will migrate to one of the electrodes. The direction and rate of movement of the particles is a function of the viscosity and dielectric constant of the liquid in the boundary layer, the applied potential gradient, as well as the magnitude and sign of the net charge on the particles. Thus according to the Helmholtz-Smoluchowski equation:

Zeta-potential $= 4\pi\mu\eta/D$

Where $\mu =$ electrophoretic mobility
$\eta =$ dielectric constant
$D =$ dielectric constant Thus, by applying a known voltage and by measuring the direction and velocity of the particles and the viscosity and dielectric constant of the system the zeta-potential may be calculated. Consequently the proper amount of flocculant to be added may be readily determined from a measurement of the electrophoretic mobility with a Zeta-Meter (manufactured by Zeta-Meter Inc., New York, New York).

The polymeric flocculants useful in this invention are widely known and commercially available. The polymer, in addition to being soluble in the system, must contain substituents which will form polymeric ions, either through ionization or complex formation. The cationic polymeric flocculants of this invention have substituents which will either ionize or form a complex which will transform the polymeric portion into a cation. Typical commercial cationic polymeric flocculants include:

"*Primafloc C-3*" (Trademark for cationic flocculant sold by Rohm & Haas Company).
  Molecular Weight: Approx. 30,000
  Structure: Polyamine
  Form: 30% polymer in aqueous solution
  pH: 12–14
  Specific Gravity at 25° C.: 1.17–1.20
  Viscosity at 25° C.: 270 cp.

"*Reten 205 MH*" (Trademark for Hercules' commercial cationic flocculant.)
  A high molecular weight, medium viscosity, cationic flocculant.

"*Purifloc C-31*" (Trademark for Dow Chemical Company commercial cationic flocculant.)
  Molecular Weight: Approx. 1 million
  Structure: Polyamine
  pH: 8–10
  Specific Gravity at 25° C.: 1.2
  Solubility: All proportions with water Pour Point: −24° F.

Correspondingly, anionic polymeric flocculants must contain substituents which will either ionize or form a complex which will transform the polymeric portion into an anion. Typical commercial anionic polymeric flocculants include:

"*Purifloc A–22*" (Trademark for Dow Chemical Company commercial anionic flocculant.)
  Molecular Weight: Several million
  Structure: Polyacrylamide with negative acrylate groups "*Purifloc A–23*" (Trademark for Dow Chemical Company commercial anionic flocculant.)
  Molecular Weight: Several million (greater than A–22)
  Structure: Polyacrylamide with negative acrylate groups
  pH, 0.25 % soln.: 10.1

The flocculants useful in this invention are not limited to these particular commercial products; rather, this invention encompasses all flocculants which possess the aforementioned characteristics.

Polymers having certain properties are preferred in the selection of a first flocculant. Since the primary function of the first flocculant is to neutralize the net charge on the particles, it is desirable to employ highly polar compounds. Though high molecular weight polymers can be used, it is generally more desirable to use low molecular weight polymers (less than 30,000) since the higher molecular weight polymers tend to be less polar.

The polymers preferred in the selection of the second flocculant are dependent on different considerations. Their primary function is not to neutralize, but to bridge the gaps between the small flocs which have just been formed by the first flocculant. Consequently, there is no particular desire to use a highly polar compound and the important feature is the molecular weight. The preferred molecular weight ranges from 100,000 to 10,000,000 and more preferably from 500,000 to 5,000,000. The use of lower molecular weight polymers may be somewhat ineffective because of solubility problems.

The process of the present invention may be employed in any colloidal system except as limited by the solubility of the polymeric flocculants employed. Thus, the process will be more effective in the case of highly polar solvents such as water than in solvents which are much less polar.

The removal of colloidal particles from a system is of special importance to chemical related industry and of general importance to all industry. Purification of a commercial chemical product is often accomplished by separation processes. Consequently, the process of the present invention will be useful because its enables manufacturers to produce higher purity products. Industry in general will also be able to make use of the invention since it has general applicability in the field of waste water purification. Colloidal contaminants are particularly undesirable because they cause waste water to appear turbid and because odor and taste components are adsorbed on them. In particular, negatively charged colloidal contaminants may be removed from waste water by the process of this invention.

The importance of finding effective means of employing *polymeric* flocculants in place of the conventional *inorganic* agents is apparent from the advantages which the polymeric flocculants possess. The amount of polymeric flocculant which must be added to effect satisfactory flocculant required. For example 1 to 5 p.p.m. polymeric flocculant may be as effective as 30 to 100 p.p.m. of an inorganic flocculant such as alum. Further, removed material containing the polymeric flocculant plus colloid particles is more easily disposed of since it may be burned.

The process of the invention also has a distinct advantage over prior methods of treating with polymeric flocculants. The flocs produced by application of the present invention are larger, less dense and strongly bonded. As a result, subsequent removal steps such as flotation or filtration will remove the undesired particles from the system with a greater degree of efficiency. In addition, the process of the present invention minimizes the use of the expensive polymeric flocculants and avoids trial and error techniques previously necessary to determine the proper addition rates. The following four examples demonstrate the process of the present invention. In the first three examples, a model colloidal system of polystyrene latex in water (approx. 90 p.p.m.) was chosen to insure uniformity and consistency of behavior. The density of the polystyrene is 1.05 g./cc. The molecular weight varies over a broad range from 50,000 to 100,000 (number average); however, the particle size is still quite precise. (The standard deviation is approximately 6½%.) The particles in such a system have a zeta-potential of approximately −40 mv. and a particle diameter on the order of 910 A. This system is often used as a standard in electron microscope studies and consequently the particle characteristics are well known. The fourth example demonstrates the application of this invention to a colloidal waste-water system.

EXAMPLE 1

Incremental amounts of a cationic flocculant are added to the model latex system and the corresponding zeta-potential and floc appearance are noted. Electrophoretic mobility is measured with a Zeta-Meter Since the dielectric constant and viscosity of the system may be measured by standard techniques the zeta-potential may be calculated by the Helmholtz-Smoluchowski equation and, consequently, the addition rate may be properly controlled. The examples show that at lower addition levels the colloidal dispersion has not destabilized and at greater addition levels the dispersion has restabilized and the system is again relatively clear. The optimum flocculation for a single flocculant occurs at approximately zero Zeta-potential (3.1 p.p.m.), but even then the flocs obtained are quite small.

This result is compared to a sequential addition in the manner described in this invention. After the addition of 3.1 p.p.m. of the cationic flocculant the zeta-potential has reversed and .1 p.p.m. of the anionic flocculant is added. Though only small flocs are obtained by the addition of the cationic flocculant alone, the sequential addition results in very large flocs of low density which, upon agitation, are found to be strongly bonded. Thus, the flocs formed by the process of this invention can be more easily removed from the system.

| Polymeric Flocculant, p.p.m. | Zeta Potential, mv. | Appearance |
|---|---|---|
| 0 | −38 | Clear |
| 0.1 (Cationic)[1] | −32 | Clear |
| 1.0 (Cationic) | −15 | Very small flocs |
| 2.1 (Cationic) | −7 | Small flocs |
| 3.1 (Cationic) | +10 | Small flocs |
| 10 (Cationics) | +33 | Very small flocs |
| 30 (Cationics) | +33 | Few flocs |
| 50 (Cationics) | +30 | Clear |
| Sequential 3.1 (Cationic) + 1.0 (Anionic)[2] | −22 | Very large flocs of low density |

[1] "Primafloc C–3".
[2] "Purifloc A–22".

EXAMPLE 2

The same procedure as in example 1 is followed except different flocculants are used.

| Polymeric Flocculant, p.p.m. | Potential, mv. | Appearance |
|---|---|---|
| 0 | −42 | Clear |
| 0.1 (Cationic)[1] | −39 | Clear |
| 1.0 (Cationic) | −26 | Clear; few small flocs |
| 2.0 (Cationic) | −24 | Small flocs |
| 4.0 (Cationic) | −18 | Large and small flocs |
| 6.0 (Cationic) | 0 | All flocs—large and small |
| 8.0 (Cationic) | +28 | Some large flocs |
| 30 (Cationic) | +39 | Few large flocs |
| 50 (Cationic) | +35 | Some small flocs |
| Sequential 8.0 (Cationic) + 1.0 (Anionic)[2] | −27 | Very large flocs |

[1] "Reten 205 MH"
[2] "Purifloc A–23"

EXAMPLE 3

The same procedure as in examples 1 and 2 is followed except different flocculants are used.

| Polymeric Flocculant, p.p.m. | Zeta Potential, mv. | Appearance |
|---|---|---|
| 0 | −41 | Clear |
| 0.1 (Cationic)[1] | −35 | Clear |
| 1.0 (Cationic) | −14 | Small flocs |
| 2.0 (Cationic) | 0 | Many large flocs |
| 3.0 (Cationic) | +15 | Many large flocs |
| 10 (Cationic) | +44 | Large and small flocs |
| 30 (Cationic) | +51 | A few small flocs |
| 50 (Cationic) | +51 | Clear—no flocs |
| Sequential 3.0 (Cationic) + 1.0 (Anionic)[2] | −5 | All very large flocs |

[1] "Purifloc C-31"

[2] "Purifloc A-22"

EXAMPLE 4

The procedure of the preceding examples is used except the system is a waste-water system and a different combination of flocculants is employed.

| Polymeric Flocculant, p.p.m. | Zeta Potential, mv. | Appearance |
|---|---|---|
| 0 | −19 | Slightly turbid |
| 0.1 (Cationic)[1] | −19 | Slightly turbid |
| 1.0 (Cationic) | −14 | Turbid (small flocs) |
| 2.0 (Cationic) | 0 | Turbid (small flocs) |
| 3.0 (Cationic) | 0 | Turbid (small and medium flocs) |
| 5.0 (Cationic) | 0+ | Turbid (small and medium flocs) |
| 10 (Cationic) | +14 | Turbid (medium flocs) |
| 30 (Cationic) | +20 | Slightly turbid (small flocs) |
| 50 (Cationic) | +22 | Slightly turbid (few small flocs) |
| Sequential 5.0 (Cationic) + 1.0 (Anionic)[2] | −16 | Very slightly turbid (large flocs floating) |

[1] "Primafloc C-3"

[2] "Purifloc A-23"

I claim:

1. A process for flocculating charged particles dispersed in a colloidal system, comprising:
   a. adding a first polymeric flocculant having a molecular weight less than 30,000 and whose polymeric ion form has a charge opposite in sign to that of the particles, in an amount sufficient to reverse the sign of the zeta-potential of the system and attain a zeta-potential of at least 10 millivolts of the opposite sign; and
   b. then adding a second polymeric flocculant having a molecular weight between 100,000 and 10,000,000 and whose polymeric ion form has a charge opposite in sign to that of the first polymeric ion, in an amount sufficient to again reverse the sign of the zeta-potential of the system.

* * * * *